(12) United States Patent
Lu

(10) Patent No.: US 6,706,371 B2
(45) Date of Patent: Mar. 16, 2004

(54) FILM WITH EDGE TRIM

(75) Inventor: Pang-Chia Lu, Pittsford, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 33 days.

(21) Appl. No.: 09/734,293

(22) Filed: Dec. 11, 2000

(65) Prior Publication Data

US 2002/0071938 A1 Jun. 13, 2002

(51) Int. Cl.[7] ................................ B32B 23/02
(52) U.S. Cl. .................. 428/192; 428/101; 428/156; 428/157; 428/141; 428/480; 428/44; 428/45; 428/57; 428/58; 264/167; 264/177.1
(58) Field of Search ................... 428/192, 480, 428/156, 157, 44–45, 57–58, 141, 88, 85, 101; 264/167, 177.1

(56) References Cited

U.S. PATENT DOCUMENTS

| | | | |
|---|---|---|---|
| 4,377,616 A | | 3/1983 | Ashcraft et al. ............ 428/213 |
| 4,632,869 A | | 12/1986 | Park et al. ................ 428/315.5 |
| 5,223,346 A | * | 6/1993 | Lu ............................... 428/516 |
| 5,650,451 A | | 7/1997 | Yagi et al. |
| 5,885,721 A | * | 3/1999 | Su et al. ...................... 264/280 |
| 5,933,930 A | | 8/1999 | Rutz ............................... 26/89 |
| 6,048,608 A | * | 4/2000 | Peet et al. ................ 428/315.5 |
| 6,118,218 A | | 9/2000 | Yializis et al. .......... 315/112.21 |
| 6,197,430 B1 | * | 3/2001 | Asakura et al. ........... 264/288.4 |
| 6,322,883 B1 | * | 11/2001 | Williams .................. 428/308.4 |
| 6,391,404 B1 | * | 5/2002 | Rosenbaum et al. ....... 428/35.2 |

OTHER PUBLICATIONS

S. A. Pirzada, A. Yializis, W. Decker and R. E. Ellwanger, "Plasma Treatment of Polymer Films", Society of Vacuum Coaters 42nd Annual Technical Conference Proceedings, Chicago, 1999, pp. 301–306.

* cited by examiner

Primary Examiner—Cynthia H. Kelly
Assistant Examiner—Tamra Dicus
(74) Attorney, Agent, or Firm—Rick F. James

(57) ABSTRACT

An edge trim is coextruded on a polyolefin film layer. The edge trim protects the film from damage during a stretching operation, wherein clamps, clips or hooks of a tenter frame are attached to the edge regions of the film and the film is stretched in the transverse direction (TD).

16 Claims, 1 Drawing Sheet

FILM WITH EDGE TRIM

BACKGROUND

An edge trim is coextruded on a polyolefin film layer. The edge trim protects the film from damage during a stretching operation, wherein clamps, clips or hooks of a tenter frame are attached to the edge regions of the film and the film is stretched in the transverse direction (TD).

Films can be oriented in the machine direction (MD) by passing the film over a series of rollers, whereby a stretching force is applied in the machine direction (MD). Such MD stretching does not require the use of clamps to secure the film.

Tenter frames are often used to stretch films in the transverse direction (TD). In order to achieve TD stretching, it is known to use a film stretching machine including tenter clamps, clips or hooks that are mounted and conveyed on tenter chains and that are guided along expanding guide rails. The tenter clamps hold the edges of the film as it is being stretched.

The use of tenter frames to stretch films is described in U.S. Pat. No. 5,933,930.

When stretching forces become too great, the film will tend to break or tear at points of weakness. A particular point of weakness is where the film is secured by tenter clamps, clips or hooks during TD stretching.

When certain additives are included an extruded film, the ability of the film to resist breaking or tearing during stretching may be reduced. An example of such an additive is a cavitating agent.

Non-cavitated skin layers applied to both surfaces of a cavitated film may help the overall film structure to resist breaking or tearing during stretching. However, it is extremely difficult to make a cavitated film with no skin, especially when the film is stretched in the TD at commercial scale rates and conditions. The tender clips can break the cavitated cells during stretching, which normally takes place in an oven. Such breaking interrupts the stretching process and often results in equipment contamination.

SUMMARY

There is provided a biaxially oriented film comprising an extruded polyolefin layer and a coextruded polyolefin edge trim, wherein said edge trim is aligned on both sides of the extruded polyolefin layer in a direction parallel to the machine direction (MD) of the film.

There is also provided a method for making a biaxially oriented film, said method comprising the steps of:

(a) coextruding a polyolefin film layer with polyolefin edge trims on both sides of the extruded polyolefin layer;

(b) stretching the extruded film of step (a) in the machine direction;

(c) attaching clamps, clips or hooks of a tenter frame to the edge trim regions of the film of step (b); and (d) stretching the film of step (c) in the transverse direction by means of said tenter frame.

The edge trim strengthens the edge regions of the film and provides resistance to breakage in the regions where the film is secured by tenter clamps, clips or hooks.

DETAILED DESCRIPTION

Figure 1:
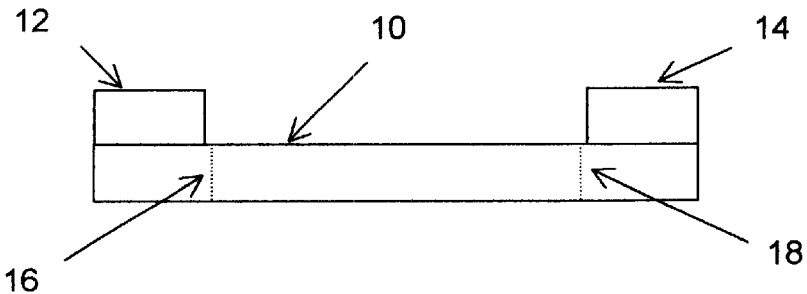
FIG. 1 is a schematic representation of a cross-section of a film having two edge trim strips over a film layer.

The polyolefins of the present films may be homopolymers or interpolymers. For purposes of the present invention, the term "interpolymer" includes various polymers other than homopolymers, such as random copolymers, terpolymers, etc., as well as block polymers, graft polymers, etc. Examples of such polyolefins include homopolymers, such as polyethylene (PE) and polypropylene (PP), copolymers, such as ethylene-propylene (EP), and terpolymers, such as terpolymers of ethylene, propylene and a $C_4$ to $C_{10}$ alpha-olefin, especially an ethylene-propylene-butylene (EPB) terpolymer. Blends of polyolefin polymers may be used.

Particular polyolefins include polypropylene, such as Fina 3371, and high density polyethylene (HDPE). Particular HDPE polymers include HDPE M-6211 and HDPE M-6030 sold by Lyondell Chemical Company, HD-6704.67 sold by Exxon Chemical Company, BDM 94-25 available from Fina Oil and Chemical Co. Dallas, Tex., and 19C and 19F available from Nova Corporation, Sarnia, Ontario, Canada.

HDPE may have a density of about 0.940 to about 0.980 g/cm$^3$, a melting point of about 115 to about 140° C., and a melt index of about 0.5 to about 12 g/10 minutes (measured in accordance with ASTM D1238 under a load of 2.16 kg at 190° C.). For example, HDPE may have a density of about 0.950 to about 0.970 g/cm$^3$, a melting point of about 120 to about 134° C., and a melt index of about 1 to about 6 g/10 minutes.

When a copolymer of ethylene and propylene or a terpolymer of ethylene, propylene and a $C_4$ to $C_{10}$ alpha-olefin are used, the copolymer or terpolymer may be comprised predominantly of propylene. Such copolymer or terpolymer, may contain more than about 80% propylene.

Ethylene or propylene homopolymers may include a copolymer or a blend of different kinds of ethylene or propylene polymers.

An incompatible material, also referred to herein as a cavitating agent, is blended with polyolefin to provide a voided layer. Such agents may be added to the polyolefin prior to extrusion and are capable of generating voids (cavities) in the structure of the film during the film-making process. It is believed that small inhomogeneities introduced into the polyolefin layer by the cavitating agent result in points of weakness in the polyethylene sheet. The biaxially orienting step then induces separations in the polyolefin layer, causing cavitation in the processed film. The separations in the core layer vary in size and may be formed not only horizontally, i.e., within or parallel to the plane of the film, but also in the vertical dimension or perpendicular to the plane of the film.

Inorganic cavitating agents may be used. A particular cavitating agent is calcium carbonate ($CaCO_3$).

Organic cavitating agents, such as polystyrene and polybutylene terephthalate (PBT), may be used. When used, the organic cavitating agents may be extremely finely divided and resistant to melt at operating temperatures in order to produce the desired degree of inhomogeneity in the polymer sheet. Crosslinked polymeric cavitating agents tend to be particularly melt resistant. Cavitating agents can be included using methods known in the art, such as that described in U.S. Pat. Nos. 4,377,616 and 4,632,869, incorporated herein by reference.

The percentage of cavitating agent included in the polyolefin layer may be from 2 wt % to 40 wt %, for example, from 4 wt % to 20 wt %.

The blend of polyolefin and cavitating agent may be passed through a flat sheet extruder die at a temperature ranging from about 230° C. to about 280° C. This layer may be coextruded with one or more backing layers to form a multi-layer film. The extruded layers may be cast onto a cooling drum, quenched and stretched to achieve biaxial orientation.

Biaxial orientation of the present film tends to evenly distribute strength qualities of a film in the longitudinal or "machine direction" (MD) of the film and in the lateral or "transverse direction" (TD) of the film. Biaxial oriented films tend to be stiffer and stronger, and also exhibit much better resistance to flexing and folding forces.

Most biaxial orientation processes use apparatus which stretches the films sequentially, first in one direction and then in the other, preferably in the MD first and then in the TD. A discussion of high biaxial orientation of polyethylene films is provided in U.S. Pat. No. 5,885,721. The present films may, for example, be stretched in the MD from about 5:1 to about 8:1 and in the TD from about 6:1 to about 15:1.

Cavitated films may have an open cell or closed cell structure. In the open cell structure, void spaces are continuous or interconnected so as to form pores which have an opening on at least one surface of the film layer. In a closed cell structure, the void spaces are disconnected, for example, in the form of bubbles, which are isolated from the surfaces of the film layer by a continuous polymeric matrix.

Films with a closed cell pore structure may be prepared by the method of U.S. Pat. No. 4,632,869. In U.S. Pat. No. 4,632,869, a cavitated (i.e. void containing) film is generated by biaxially orienting a film including a blend of a polybutylene terephthalate cavitating agent in a thermoplastic polymer matrix, such as a polypropylene matrix. The voids generated in this process impart opacity to the film.

Methods for making films with a surface layer with an open cell pore structure are described in U.S. application Ser. No. 09/079,807, filed May 15, 1998. According to this method a cavitating agent is used with a particular polymeric matrix material, which is high density polyethylene (HDPE) or medium density polyethylene (MDPE). When this material is stretched, separations which form voids are formed not only horizontally, i.e. within or parallel to the plane of the film, but also in the vertical dimension or perpendicular to the plane of the film.

When HDPE is chosen as the polyolefin of the cavitated layer, an open cell layer with a random matrix structure may result. In view of the random matrix structure of the present cavitated HDPE films, it is difficult to precisely measure the average pore diameter of these layers. However, average pore diameter may be estimated by observation of the film under a scanning type electron microscope. In general terms, these cavitated HDPE layers may have an average pore diameter of 0.1 to 10 microns, for example, from 0.1 to 2 microns.

These cavitated HDPE layers may have a void content (also referred to herein as porosity) of at least 20%, e.g., 20–85%, preferably at least 50%. Porosity is measured by dividing $(T_1-T_2)$ by $T_1$ and multiplying this fraction by 100, wherein $T_1$ is the thickness of the cavitated layer and $T_2$ is the thickness of the layer in the absence of cavitation. $T_2$ may be calculated on the basis of the density of the HDPE.

Polyolefins may be treated to modify their surface properties. Treating methods include casing, electronic treating and flame treating. Such treating methods may be used on one or both of the exposed surfaces of the present film.

A preferred treatment for the present films is an atmospheric plasma treatment. Such plasma treatment may take place under atmospheric conditions, i.e. conditions where a vacuum is not applied during treatment. Such atmospheric plasma treatments are described in U.S. Pat. No. 6,118,218 and in an article by S. A. Pirzada, A. Yializis, W. Decker and R. E. Ellwanger, entitled "Plasma Treatment of Polymer Films", Society of Vacuum Coaters $42^{nd}$ Annual Technical Conference Proceedings, Chicago, 1999, pp. 301–306. By means of this atmospheric plasma treatment, it is possible to apply plasma to the cavitated polyolefin surface at a temperature less than the melting point of the polyolefin, e.g., less than 130° C. or even less than 100° C. Equipment for making such plasma treatments at or near atmospheric pressures is available from Sigma Technologies International, Inc., 10960 N. Stallard Place, Tucson, Ariz. An operating frequency of 40 kHz is recommended for plasma treatment of polymer surfaces.

An advantage of the atmospheric plasma treatment is that it can take place under conditions insufficient to generate enough heat to melt polymers or otherwise distort the structure of the film, especially the cavitated portions thereof. By way of contrast, U.S. Pat. No. 5,650,451 states that treatment of a biaxially oriented high molecular weight film at a temperature of 132 to 145° C. for one second to ten minutes can result in a loss of specific surface area of 20 $m^2/g$ or more.

In order to assure maximum penetration of plasma into exposed pores of an open celled cavitated film, the operating frequency may be adjusted to a rather high level. In particular, the frequency of the plasma generating electrode may be at least 1 MHz, for example, from 1 MHz to 20 MHz.

The plasma treating gas may include one or more of a variety of gases including oxygen, nitrogen, air, carbon dioxide, methane and other inert or reactive gases. For example, an oxygen containing gas, such as $O_2$, $CO_2$ or air, may be used alone or, optionally, in admixture with an inert gas, such as argon or helium.

FIG. 1 is a schematic representation of a cross-section of film coextruded with edge trim strips 12 and 14 viewed along the machine direction (MD). In FIG. 1, layer 10 contains an additive, such as a cavitating agent (not depicted). This layer 10 is protected from breaking when stretched in the transverse direction (TD) by edge trim strips 12 and 14, which are coextruded with layer 10, over the outer edges of layer 10. The edge trim strips 12 and 14 preferably do not include a cavitating agent. These edge trim strips 12 and 14 need only be wide enough to be within the reach of the clips, clamps or hooks of the tenter frame used in the transverse stretching step. After the film shown in FIG. 1 is stretched in the transverse direction, the edge trim strips 12 and 14 may be removed, along with an underlying portion of layer 10, by cutting layer 10 just inside of the edge trim strips 12 and 14 along dotted lines 16 and 18. When layer 10 has a highly cavitated, open cell structure, it may also be possible to simply peel edge trim strips 12 and 14 off of layer 10.

Figure 2:
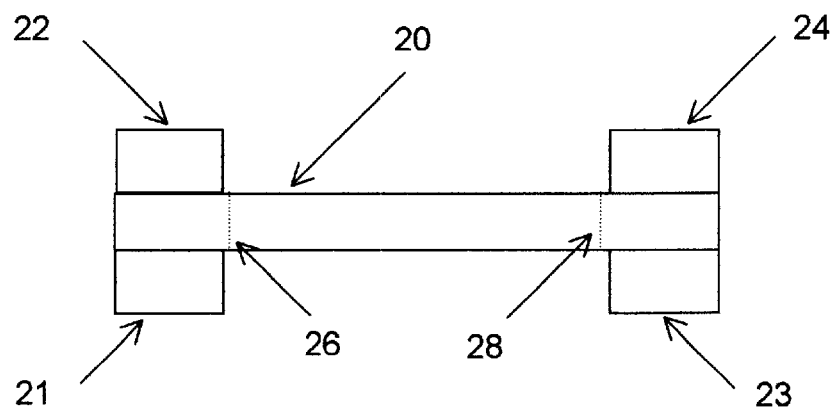
FIG. 2 is a schematic representation of a cross-section of a film having two edge trim strips over a film layer and two edge strips under the film layer.

FIG. 2 is a schematic representation of a cross-section of film coextruded with edge trim strips 21, 22, 23 and 24 viewed along the machine direction (MD). In FIG. 2, layer 20 contains an additive, such as a cavitating agent (not depicted). This layer 20 is protected from breaking when stretched in the transverse direction (TD) by edge trim strips 21, 22, 23 and 24, which are coextruded with layer 20, over and under the outer edges of layer 20. The edge trim strips 21, 22, 23 and 24 preferably do not include a cavitating agent. These edge trim strips 21, 22, 23 and 24 need only be wide enough to be within the reach of the clips, clamps or hooks of the tenter frame used in the transverse stretching step. After the film shown in FIG. 2 is stretched in the transverse direction, the edge trim strips 21, 22, 23 and 24 may be removed, along with a portion of layer 20, by cutting layer 20 just inside of the edge trim strips 21, 22, 23 and 24 along dotted lines 26 and 28.

Figure 3:
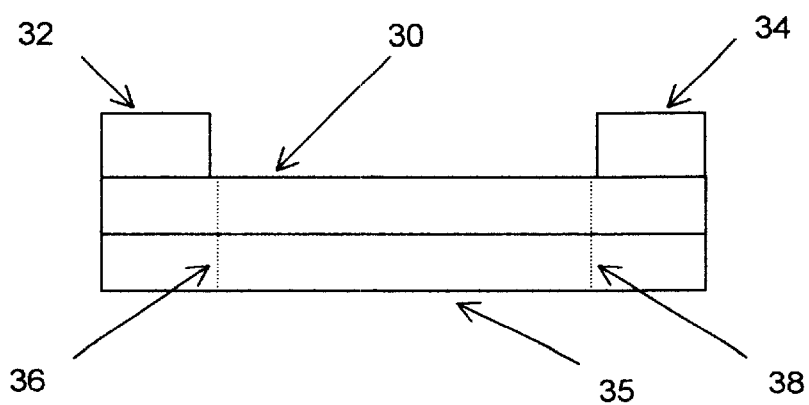
FIG. 3 is a schematic representation of a cross-section of a film having two edge trim strips over a core film layer and a backing or skin layer under the core layer.

FIG. 3 is a schematic representation of a cross-section of film coextruded with edge trip strips 32 and 34 viewed along the machine direction (MD). In FIG. 3, layer 30 contains an additive, such as a cavitating agent (not depicted). This layer 30 is protected from breaking when stretched in the transverse direction (TD) by edge trim strips 32 and 34, which are coextruded with layer 30 over the outer edges of layer 30. These edge trim strips 32 and 34 preferably do not include a cavitating agent. These edge trim strips 32 and 34 need only be wide enough to be within the reach of the clips, clamps or hooks of the tenter frame used in the transverse stretching step. The film structure shown in FIG. 3 also includes a backing or skin layer 35, which is coextruded with layer 30. This layer 35 may be cavitated or non-cavitated (i.e. free of void spaces). After the film shown in FIG. 3 is stretched in the transverse direction, the edge trim strips 32 and 34 may be removed, along with an underlying portion of layers 30 and 35, by cutting layers 30 and 35 just inside of the edge trim strips 32 and 34 along dotted lines 36 and 38.

Instead of a single backing layer 35, as shown in FIG. 3, it will be understood that the present film may include multiple film layers on the side opposite the edge trim strips. Each of the present film layers may, optionally include various additives, such as anti-blocks, anti-static agents, coefficient of friction (COF) modifiers, processing aids, colorants, clarifiers, and other additives known to those skilled in the art. For example, the bottommost skin layer may include an antiblocking agent.

What is claimed is:

1. A biaxially oriented film comprising an extruded polyolefin layer and a first pair of coextuded polyolefin edge trims, wherein said extruded polyolefin layer has a first exterior surface and a second exterior surface, each of the first pair of said-edge trims are aligned upon respective outer edges of at least the first surface of the extruded polyolefin layer in a direction parallel to the machine direction (MD) of the film, and wherein each of the first pair of edge trims are positioned wholly within a respective opposed outer edge, the outer edge being a removable portion of the biaxially oriented film, whereby the thickness of the outer edge of the biaxially oriented film is greater than the thickness of the extruded polyolefin layer.

2. The film according to claim 1, wherein said polyolefin is selected from the group consisting of polypropylene and high density polyethylene, and wherein said extruded polyolefin layer comprises an additive selected from the group consisting of a cavitating agent and a pigment.

3. The film according to claim 2, wherein said additive is a cavitating agent, and wherein said extruded layer is a surface layer.

4. The film according to claim 3, wherein said cavitating agent is calcium carbonate, and wherein said polyolefin is high density polyethylene.

5. The film according to claim 3, wherein said cavitating agent is polybutylene terephthalate, and wherein said polyolefin is polypropylene.

6. The film according to claim 2, wherein said additive is a pigment, wherein said pigment is titanium dioxide, and wherein said polyolefin is polypropylene.

7. The film according to claim 1, wherein said extruded polyolefin layer has an open cell cavitated structure.

8. The film according to claim 1, wherein said extruded polyolefin layer has a closed cell cavitated structure.

9. A method for making a biaxially oriented film, said method comprising the steps of:
   (a) coextruding a polyolefin layer that has a first surface and a second surface with a first pair of polyolefin edge trims such that each of the first pair of said polyolefin edge trims are aligned upon respective outer edges of at least the first surface of said extruded polyolefin layer in a direction parallel to the machine direction (MD) of the film; wherein each of the second pair of edge trims are positioned wholly within a respective opposed outer edge, the outer edge being a removable portion of the biaxially within a respective opposed outer edge, the outer edge being a removable portion of the biaxially oriented film, whereby the thickness of the outer edge of the biaxially oriented film is greater than the thickness of the extruded polyolefin layer,
   (b) stretching the coextruded film of step (a) in the machine direction;
   (c) attaching clamps, clips or hooks of a tenter frame to the outer edge trim regions of the film of step (b); and
   (d) stretching the film of step (c) in the transverse direction by means of said tenter frame.

10. The method according to claim 9, wherein said method further comprises a step (e) of removing said polyolefin edge trims.

11. The method according to claim 10, wherein said polyolefin edge trims are removed by cutting.

12. The method according to claim 10, wherein said polyolefin film layer has an open-cell cavitated structure and said polyolefin edge trims are removed by peeling.

13. The method according to claim 9, further comprising a second pair of coextruded polyolefin edge trims, each of the second pair of edge trims are aligned upon respective both sides of the second surface of said extruded polyolefin layer in a direction parallel to the MD of the film and wherein each of the second pair of edge trims are positioned wholly within a respective opposed outer edge, the outer edge being a removable portion of the biaxially oriented film, whereby the thickness of the outer edge of the biaxially oriented film is greater than the thickness of the extruded polyolefin layer.

14. The method according to claim 9, wherein said first pair of polyolefin edge trims are coextruded with said polyolefin film layer such that said first pair of polyolefin edge trims are aligned on both sides of the first surface of said extruded polyolefin film layer in a direction parallel to the machine direction (MD) of the film, and one or more additional layers are coextruded with said extruded polyolefin film layer on the second surface of said extruded polyolefin film layer.

15. The film according to claim 1, further comprising a second pair of coextruded polyolefin edge trims, each of the second pair of edge trims are aligned upon respective outer edges of the second surface of said extruded polyolefin layer in a direction parallel to the MD of the film, and wherein each of the second pair of edge trims are positioned wholly within a respective opposed outer edge, the outer edge being a removable portion of the biaxially oriented film, whereby the thickness of the outer edge of the biaxially oriented film is greater than the thickness of the extruded polyolefin layer.

16. The film according to claim 1, wherein said first pair of coextruded polyolefin edge trims are coextruded with said extruded polyolefin layer such that said polyolefin edge trims are aligned on outer edges of the first exterior surface of said polyolefin layer in a direction parallel to the machine direction (MD) of the film, and one or more additional layers are coextruded with said polyolefin layer on the second surface of said polyolefin layer.

* * * * *